US007919174B2

(12) United States Patent
Ruokolainen et al.

(10) Patent No.: US 7,919,174 B2
(45) Date of Patent: Apr. 5, 2011

(54) TAILORED CORE LAMINATED SHEET METAL

(75) Inventors: Robert B. Ruokolainen, Livonia, MI (US); Xiaohong Q. Gayden, West Bloomfield, MI (US); Xiaorong Jin, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 721 days.

(21) Appl. No.: 11/780,506

(22) Filed: Jul. 20, 2007

(65) Prior Publication Data

US 2009/0022962 A1    Jan. 22, 2009

(51) Int. Cl.
*B41M 5/00*    (2006.01)

(52) U.S. Cl. .............. 428/195.1; 428/212; 428/40.1; 428/313.4; 428/172; 72/199; 156/273.9; 181/290; 181/296

(58) Field of Classification Search .............. 428/195.1, 428/212, 40.1, 313.4, 172; 72/199; 156/273.9; 181/290, 296
See application file for complete search history.

(56) References Cited

U.S. PATENT DOCUMENTS

| 4,550,046 | A | * | 10/1985 | Miller | 428/116 |
|---|---|---|---|---|---|
| 4,942,080 | A | * | 7/1990 | Heuel et al. | 428/212 |
| 5,022,938 | A | * | 6/1991 | Wieczerniak | 148/267 |
| 5,169,723 | A | * | 12/1992 | Forster | 428/458 |
| 5,342,465 | A | * | 8/1994 | Bronowicki et al. | 156/175 |
| 5,438,806 | A | * | 8/1995 | Reinhall | 52/167.1 |
| 5,472,761 | A | * | 12/1995 | Goldberg et al. | 428/76 |
| 5,474,840 | A | * | 12/1995 | Landin | 428/450 |
| 5,507,477 | A | * | 4/1996 | Manning et al. | 267/140.3 |
| 5,691,037 | A | * | 11/1997 | McCutcheon et al. | 428/172 |
| 5,842,686 | A | * | 12/1998 | Hansen et al. | 267/140 |
| 5,851,342 | A | | 12/1998 | Vydra et al. | 156/324 |
| 6,017,597 | A | | 1/2000 | Minakami | |
| 6,202,462 | B1 | | 3/2001 | Hansen et al. | 72/199 |
| 6,495,771 | B2 | * | 12/2002 | Gaynes et al. | 174/255 |
| 6,621,658 | B1 | | 9/2003 | Nashif | 360/97.02 |
| 6,790,520 | B1 | * | 9/2004 | Todd et al. | 428/318.4 |
| 6,942,894 | B2 | | 9/2005 | Alberg | |
| 7,040,691 | B1 | | 5/2006 | Jacobs et al. | 296/193.07 |
| 7,172,800 | B2 | * | 2/2007 | Boss | 428/68 |
| 7,344,785 | B2 | * | 3/2008 | Kodaira et al. | 428/675 |

FOREIGN PATENT DOCUMENTS

| JP | 04-216040 A | 8/1992 |
|---|---|---|
| JP | 05-177762 A | 7/1993 |
| KR | 10-622024 B1 | 9/2006 |
| WO | WO 96/23163 | 8/1996 |

* cited by examiner

*Primary Examiner* — Bruce H. Hess
*Assistant Examiner* — Tamra L Amakwe

(57) ABSTRACT

A laminated sheet metal is comprised of a first sheet of metal and a second sheet of metal that are adhered together by a polymer layer core that is interposed between the two sheets and provides visco-elastic adhesion. The polymer layer has at least one region of a first polymer material that is selected for optimal viscous and elastic qualities by which to dampen the transmission of noise and vibration between the sheets, and at least one other region of a second polymer material that is selected for optimal adhesive qualities by which the sheets are optimally joined together against delamination. Thus the laminated sheet metal can be tailored to optimize the qualities that are desired for the manufacture of a particular product.

15 Claims, 3 Drawing Sheets

TAILORED CORE LAMINATED SHEET METAL

TECHNICAL FIELD

The present embodiments relate to a laminated sheet metal material having a polymer core tailored to provide varying regions of metal adhesion and vibration dampening.

BACKGROUND

It is known in modern automobile manufacture to employ laminated metal, particularly laminated steel, in the forming of components such as oil pans, rocker covers, wheelhouse inners and front-dash structures. Laminated metal is comprised of two sheets of metal, such as steel, aluminum or magnesium, with a layer of polymer interposed therebetween.

The polymer core layer acts to adhere the metal sheets together and also provides a visco-elastic coupling between the metal sheets that dampens noise and vibration.

The laminated sheet metal can be shaped by known metal forming processes such as stamping. Laminated metal is known to provide a good combination of vibration damping properties and high strength-to-weight ratios and is accordingly of interest to meeting the exacting performance demands of a variety of industries.

It would be desirable to provide a laminated sheet metal, which could be tailored to provide optimal characteristics of metal adhesion and vibration damping properties.

SUMMARY

A laminated sheet metal may be comprised of a first sheet of metal and a second sheet of metal that are adhered together by a polymer layer core that is interposed between the two sheets and provides visco-elastic adhesion. The polymer layer has at least one region of a first polymer material that is selected for optimal viscous and elastic qualities by which to dampen the transmission of noise and vibration between the sheets, and at least one other region of a second polymer material that is selected for optimal adhesive qualities by which the sheets are optimally joined together against delamination. Thus the laminated sheet metal can be tailored to optimize the qualities that are desired for the manufacture of a particular product.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
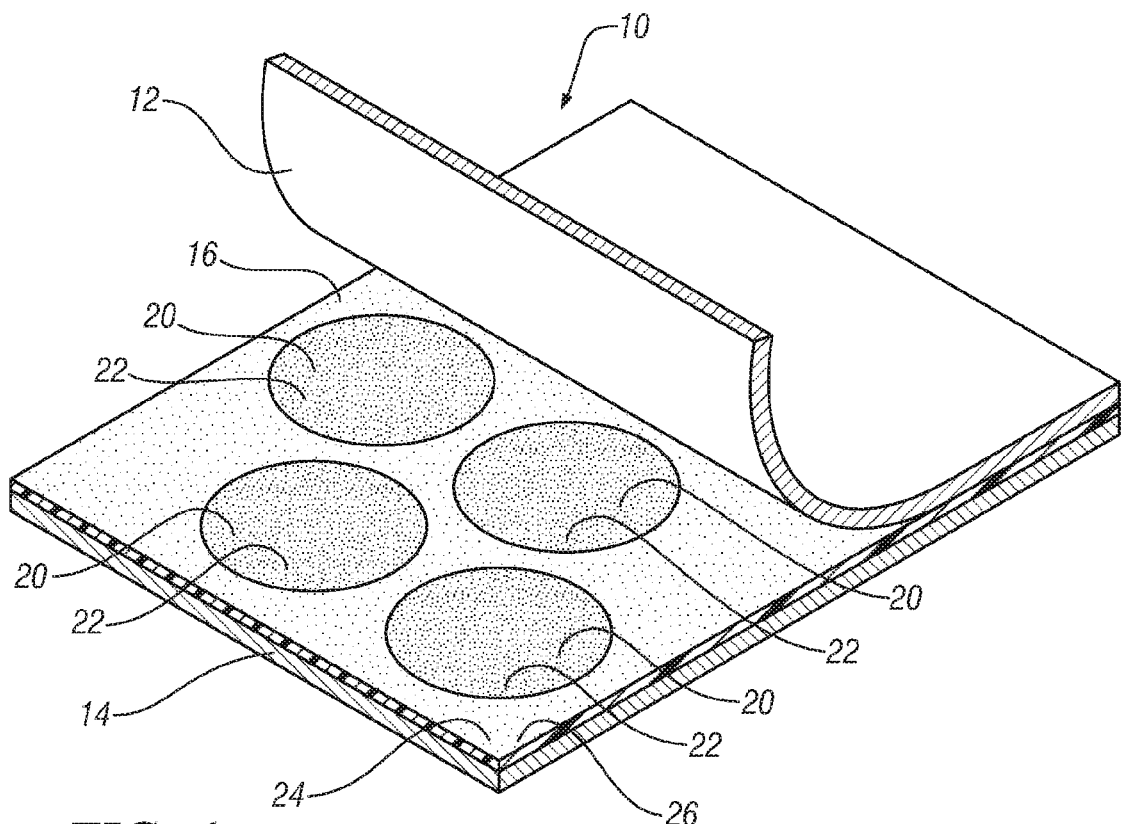
FIG. 1 is a perspective view of a laminated sheet metal having island-like regions of adhesive dispersed within the visco-elastic material.

Referring to FIG. 1, it is seen that a laminated sheet metal panel or strip 10 is comprised of an upper or top metal sheet 12 and a lower or bottom metal sheet 14 that are joined together by a polymer core layer 16. The metal sheet 12 and the metal sheet 14 may be steel or aluminum or magnesium or some other metallic material or alloy. Interstitial steel is often used, and one or both of the metal sheets 12 and 14 can have a galvanized coating, on either both sides of the sheet or on a single side of the sheet.

As seen in FIG. 1, the polymer core layer 16 is comprised of several spot or island regions 20 of a first polymer material 22, and a surrounding larger region 24 of a second polymer material 26. The first polymer material 22 is selected from among the commercially available polymers primarily for its adhesive characteristics, and the second polymer material 26 is selected from among the commercially available polymers primarily for its visco-elastic characteristics. Thus, although each of the polymer materials 22 and 26 will have both adhesive and visco-elastic characteristics, the first polymer material 22 may have adhesive qualities that are superior to the adhesive qualities of the second polymer material 26, and the second polymer material 26 has visco-elastic qualities that may be superior to the visco-elastic qualities of the first polymer material 22.

Accordingly, the product designer can tailor the core of the laminated sheet metal 10 to provide selected regions 20 of high adhesion interspersed among the other region 24 of high visco-elastic qualities. An example of a first polymer material 22 that would be chosen for its adhesive qualities is an epoxy. An example of a second polymer material 26 that is chosen for its enhanced visco-elastic damping qualities is a styrene-ethylene/butylene-styrene (SEBS) based polymer.

It will be understood that the laminated sheet metal 10 of FIG. 1 can be formed in a continuous strip manufacturing process where the metal sheets 12 and 14 are progressively unrolled from coils of sheet material. Alternatively, the laminated sheet metal 10 of FIG. 1 can be manufactured by first blanking the top metal sheet 12 and the bottom metal sheet 14 from a coil or a blank, and then applying the polymer materials 22 and 26 between the two blanks.

Figure 2:
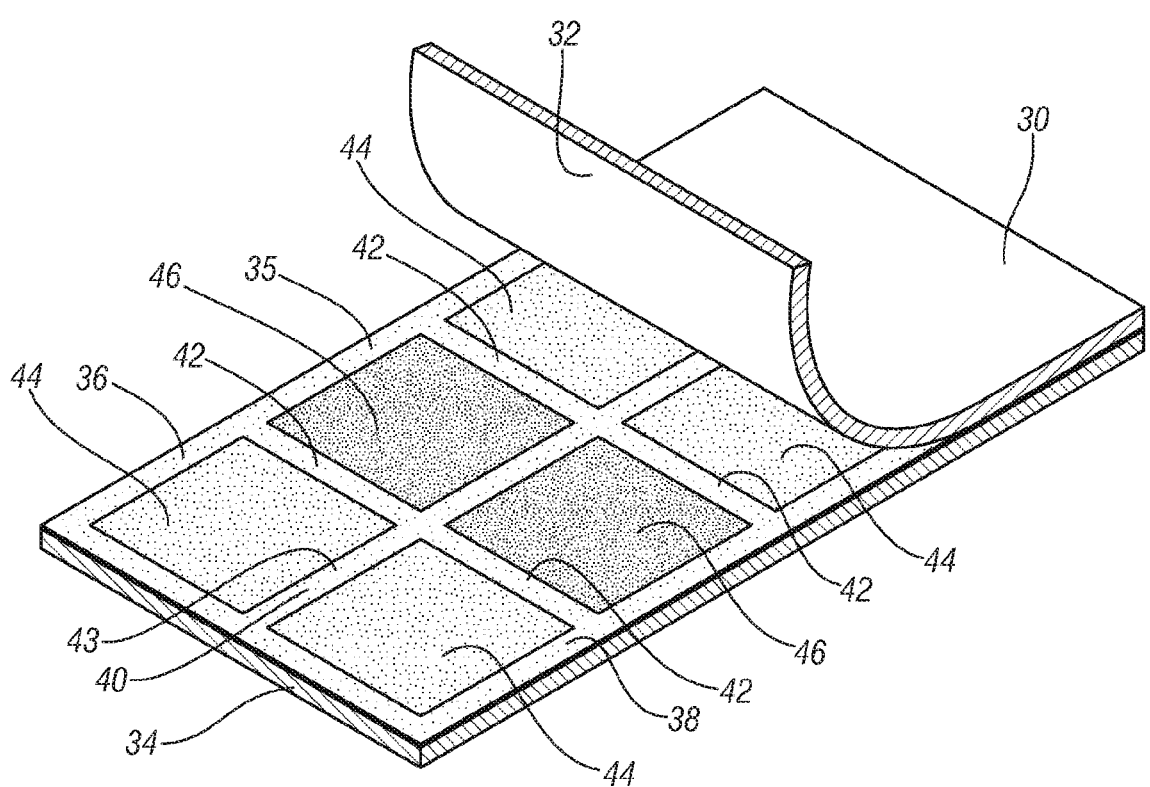
FIG. 2 is a view similar to FIG. 1 but showing an alternative embodiment in which adhesive material is placed in the regions along the edge of the sheet metal laminate and the visco-elastic material is located in regions further away from the edges of the laminated metal.

Referring to FIG. 2, another laminated sheet metal panel or strip 30 is shown having an upper metal sheet 32 and a lower metal sheet 34. In the example of FIG. 2, a first polymer material 35 selected for its adhesive qualities is provided at a left edge strip 36 and right edge strip 38 of the laminated sheet metal 30. In addition, this first polymer material 35 is also located in a longitudinal strip 40 along the center of the laminated sheet metal 30, and at crossbars 42, so that the first polymer material 35 will form a latticework 43 of high adhesion characteristic that will adhesively bond the metal sheets 32 and 34 together. FIG. 2 also shows that a second polymer material 44 is located in the some of the interstices of the latticework 43 formed by the first polymer material 35, and a third polymer material 46 is located in some of the interstices of the latticework 43. The second polymer material 44 and the third polymer material 46 are selected for their visco-elastic characteristics, and thus allow the design of a laminated sheet metal 30 that will have varying visco-elastic qualities at selected areas of the laminated sheet metal 30. Thus, as seen in FIG. 2, the metal sheets 32 and 34 will be effectively bonded together by the latticework 43 of the adhesive first polymer material 35 and the larger interstices or regions between the strips 36, 38, and 40 and the crossbars 42 of the first polymer material 35 will be occupied by the visco-elastic materials 44 and 46 to effectively and variably dampen the transmission of noise and vibration through the laminated sheet metal 30.

Figure 3:
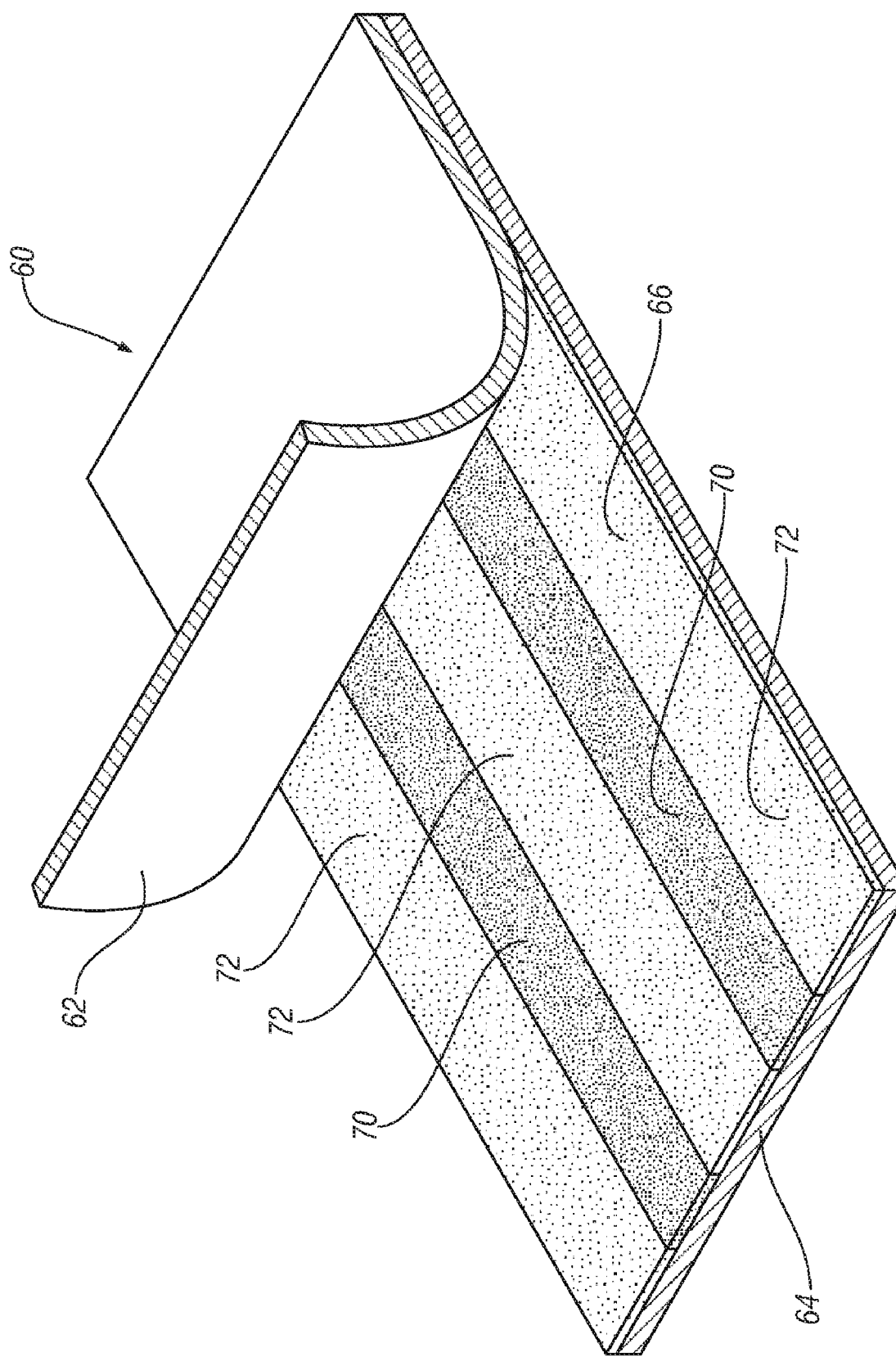
FIG. 3 is another embodiment of the invention in which the polymer core between the metal plates is formed by alternating strips of adhesive material and visco-elastic material.

Referring to FIG. 3, a third embodiment of the invention is shown where a laminated sheet metal 60 includes an upper metal sheet 62 and a lower metal sheet 64 having a polymer core 66 therebetween which is provided by alternating strips 70 of a first polymer chosen for its adhesive qualities and a second polymer 72 chosen for its visco-elastic damping qualities. In this way, alternating strip regions of high adhesion and high visco-elastic qualities can be readily laid down for coil processing by passing the lower metal sheet 64 beneath a row of polymer-dispensing nozzles or by mounting a row of nozzles on a robotic arm which passes over top the lower sheet 64. If desired, two or more different polymers can be used for their adhesive qualities and two or more different polymers can be used for their visco-elastic damping qualities. The width of the strips can be varied as desired.

Figure 4:
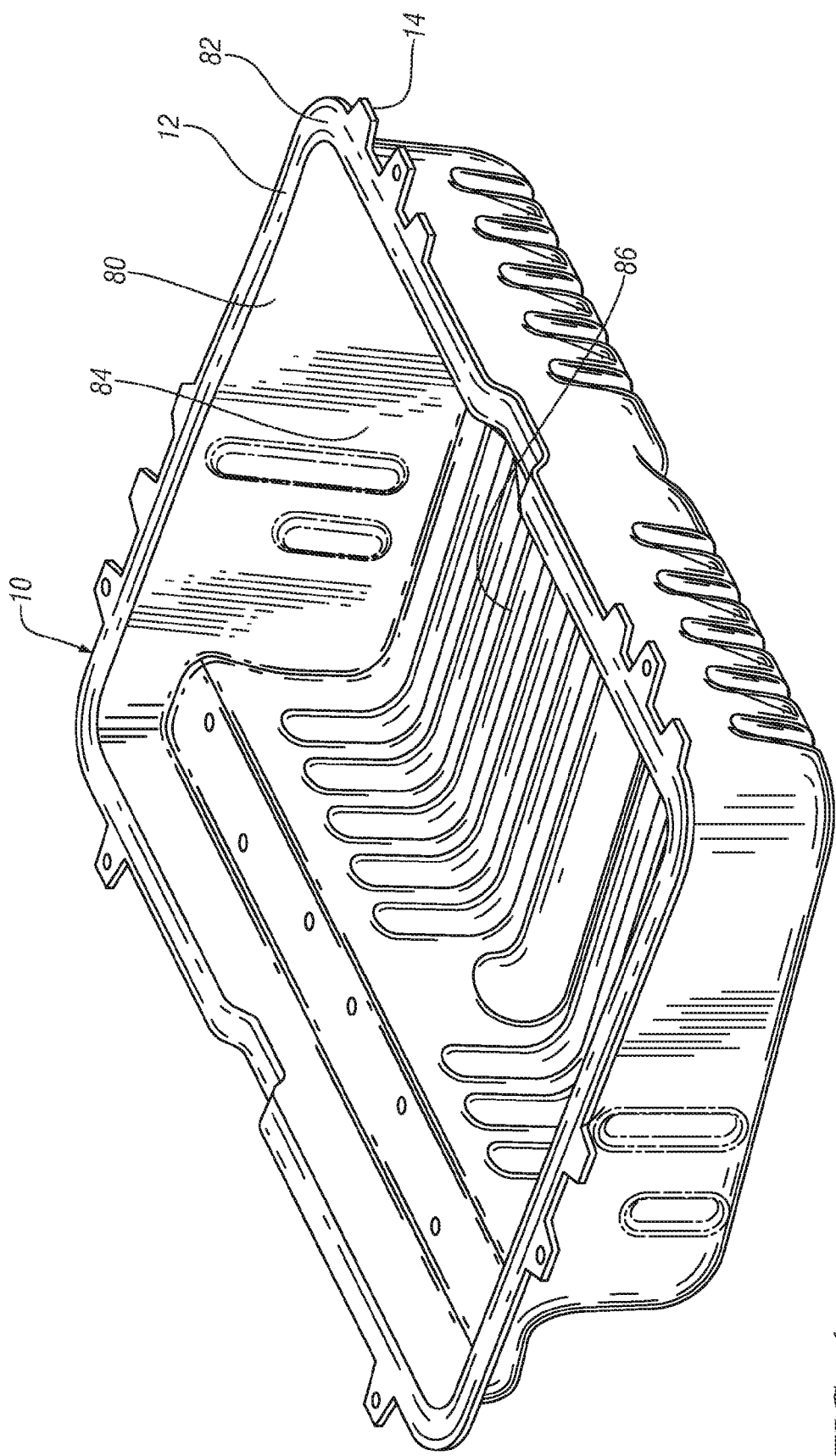
FIG. 4 is a perspective view of a vehicle seat pan construction stamped from the laminated sheet metal.

FIG. 4 shows a cup-shaped product 80, such as an oil pan, or a vehicle seat pan, which has been stamped from the laminated sheet metal 10 having alternating regions of first and second polymers.

The laminated sheet metal 10 can be particularly tailored to optimize the qualities that are desired from the manufacture of the particular product, such as the cup-shaped tub product 80, shown in FIG. 4. The tub 80 has a peripheral rim flange 82 extending around the outside thereof where the edges of the upper metal sheet 12 and lower metal sheet 14 will be exposed to the elements, including potentially, moisture, salt, and solvents. Accordingly, the designer may choose to employ a more adhesive polymer at those regions of the laminated sheet metal 10 that are destined to become the flange 82 of the stamped sheet metal tub 80, to thereby maximize the adherence of the upper metal sheet 12 and lower metal sheet 14 to guard against the possibility of delamination at the edges of the tub 80.

Furthermore, during the sheet metal forming process, such as stamping or deep-drawing to form the cup-shape of the tub 80, the laminated sheet metal 10 will be subjected to a shear and compressive forces to sever the laminated sheet metal 10 around the flange 82 and various shear and compressive forces to draw the depth of side wall 84 of the tub 80. Accordingly, the designer may choose to employ a more adhesive or less adhesive polymer at those regions of the laminated sheet metal 10 that are destined to be stressed during the forming process.

In other regions of the tub 80, such as the generally planar bottom wall 86, the designer may choose a more visco-elastic polymer, or more than one visco-elastic polymer to optimize the noise and vibration dampening characteristics of the large planar bottom wall 86.

In view of the foregoing, it will be appreciated that a skilled designer of products can tailor a laminated sheet metal in a way that accomplishes the best optimized tradeoff of the adhesive and visco-elastic characteristics desirable for the finished product. The polymers can be dispensed in the paths and patterns shown in FIGS. 1-3, and in variation thereof. Any number of two or more different polymers can be used. In addition, although the drawings show just two sheets of metal adhered together, a plurality of metal sheets can be used to form the laminated sheet metal by stacking alternating layers of sheet metal and polymers.

What is claimed is:

1. A laminated sheet metal comprising:
a first sheet of metal and a second sheet of metal;
a single polymer core layer interposed between the first and second sheets to provide visco-elastic adhesion between the sheets, said single polymer core layer being of at least one region of a first polymer material selected for optimal adhesive qualities by which the sheets are joined together against delamination, and at least one region of a second polymer material selected for optimal viscous and elastic qualities by which to dampen the transmission of noise and vibration between the two sheets, said at least one region of the first polymer material and said at least one region of the second polymer material lying side-by-side and being contiguous with one another to cooperate in providing the single polymer core layer interposed between the first and second sheets.

2. The laminated sheet metal of claim 1 further comprising:
said first polymer material being provided at least along the edge portions of the sheets to provide optimal bonding of the sheets against delamination at the edges.

3. The laminated sheet metal of claim 1 further comprising at least one of said first and second sheets having a galvanized coating on at least one face thereof.

4. The laminated sheet metal of claim 1 further comprising a plurality of first regions of the first polymer being surrounded by a second region of the second polymer.

5. The laminated sheet metal of claim 1 further comprising a plurality of second regions of the second polymer being surrounded by a first region of the first polymer.

6. The laminated sheet metal of claim 1 further comprising one of the first and second regions being a latticework of one of the polymer materials, said latticework having interstices and the other region being within the interstices of the latticework.

7. The laminated sheet metal of claim 1 further comprising the at least first region and the at least second region being alternating strip regions.

8. A laminated sheet metal comprising:
a first sheet of metal and a second sheet of metal;
an adhesive material bonding the first sheet and the second sheet at certain selected regions therebetween to obtain desired adhesion between the sheets at the certain selected regions;
and a visco-elastic material bonding the first sheet and the second sheet at other selected regions therebetween to obtain desired noise and vibration dampening at the other selected regions;
said adhesive material at the selected regions lying side-by-side with the visco-elastic material at the other selected regions so that a single layer of material is interposed between the first and second sheets and the material is either the adhesive material at the selected regions or the visco-elastic material at the other selected regions.

9. The laminated sheet metal of claim 8 further comprising said adhesive material and said visco-elastic material being two different polymer materials.

10. The laminated sheet metal of claim 8 in which both the adhesive material and the visco-elastic material have some adhesive characteristics and visco-elastic characteristics and the adhesive material is a polymer having adhesive characteristics greater than the adhesive characteristic of the visco-elastic material and the visco-elastic material is a polymer having visco-elastic characteristics greater than the adhesive characteristics of the adhesive material.

11. The laminated sheet metal of claim 8 further comprising the region of adhesive material being at least that region of the laminated sheet metal that will be subjected to forming-induced stresses so as to provide adhesion against delamination during metal forming operations to which the laminated sheet metal will be subjected in forming a product.

12. The laminated sheet metal of claim 8 further comprising the region of visco-elastic material being at least that region of the laminated sheet metal that will benefit from adhesion against delamination and the region of the adhesive material being at least that region of the laminated sheet metal that will benefit from visco-elastic action to dampen the transmission of noise and vibration.

13. A laminated sheet metal comprising:
a first sheet of metal and a second sheet of metal;
at least one adhesive material bonding the first sheet and the second sheet at certain selected regions therebetween to obtain desired adhesion between the sheets at the certain selected regions;
and at least one visco-elastic material bonding the first sheet and the second sheet at other selected regions therebetween to obtain desired noise and vibration dampening at the other selected regions;
said adhesive material at the certain selected regions lying side-by-side with the visco-elastic material at the other selected regions so that a single layer of material is interposed between the first and second sheets and the material comprising the single layer is either the adhesive material at the certain selected regions or the visco-elastic material at the other selected regions.

14. The laminated sheet metal of claim 13 further comprising two different adhesive materials bonding the first and second sheets together at the certain selected regions.

15. The laminated sheet metal of claim 13 further comprising two different adhesive materials bonding the first and second sheets together at the other selected regions.

\* \* \* \* \*